Patented Mar. 19, 1940

2,194,215

UNITED STATES PATENT OFFICE 2,194,215

METHYLATION OF PHENOLIC COMPOUNDS

Herman A. Bruson and Lloyd W. Covert, Philadelphia, Pa., assignors to The Resinous Products & Chemical Company, Philadelphia, Pa.

No Drawing. Application February 15, 1939,
Serial No. 256,494

7 Claims. (Cl. 260—621)

This invention deals with a process for introducing methyl groups into the aromatic nuclei of hydroxyaromatic compounds having phenolic properties.

The object of this invention is to provide an inexpensive method of adding one or more methyl groups to phenols, cresols, xylenols, pyrocatechols, resorcinols, hydroquinones, naphthols and other phenolic compounds. It is also an object to provide a process by which methylated hydroxy-hydroaromatic compounds may be prepared.

According to this invention, the phenolic substance which is to be nuclearly methylated is first condensed with at least one molecular equivalent each of formaldehyde and a strongly basic, non-aromatic, secondary amine to form a phenolic tertiary amine. Such condensates are in part already described in U. S. Patents Nos. 2,033,092, 2,036,916, 2,040,039, 2,040,040, and 2,045,517. The phenolic tertiary amine thus obtained is then subjected to hydrogenolysis whereby the secondary amine used is reformed, and a new methylated phenol compound is produced. By suitable modification of the process, the methylated hydro-aromatic alcohols can be produced, if desired, in place of the corresponding methylated phenols.

The reaction may be expressed as follows:

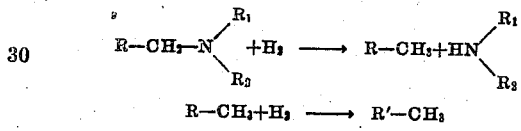

wherein R represents a hydroxyaromatic radical, R' a hydroxy-hydroaromatic radical, and $R_1$ and $R_2$ represent individually alkyl groups or jointly divalent radicals which form with the nitrogen a heterocyclic ring. For instance, by this process phenol can be converted into ortho-cresol, para-cresol, 2,4-xylenol, 2,6-xylenol or 2,4,6-trimethyl-phenol or mixtures thereof depending upon whether one, two, or three mols each of formaldehyde and a secondary non-aromatic amine are employed for the condensation. In an analogous manner cresols can be converted into xylenols; and xylenols into trimethyl- or tetramethylphenols; β-naphthol into α-methyl-β-naphthol, and so forth.

The process is applicable to hydroxy or poly-hydroxy, aromatic compounds of either monocyclic or polycyclic structure, which contain at least one reactive nuclear position ortho or para to a phenolic hydroxyl group. Such phenols are commonly termed "methylol-forming" phenols. They include the phenols and substituted phenols, naphthols, hydroxyanthracenes, hydrophenanthrenes, such as phenol, o-, m-, or p-cresol, xylenols, ethyl phenol and other alkyl phenols bearing straight or branched chains, cyclohexyl phenols, benzyl phenols, phenyl phenols, guaiacol, resorcinol, hydroquinone, α- or β-naphthol, hydroxy diphenyl dimethyl methane, etc. The compounds should be free from sulfur or halogen groups which may interfere with the catalysts, but they may contain other reactive groups, such as acyl, azo, aldehydo-, keto-, or nitro-, which are themselves capable of reduction in the process.

In forming the phenolic tertiary amine, formaldehyde and any strongly basic, secondary, non-aromatic amine can be employed, typical of which are the dialkylamines (dimethyl, diethyl, etc.) or the cyclic secondary amines (morpholine, piperidine, etc.)

Hydrogenolysis of the phenolic tertiary amine, obtained as described above, is conducted at an elevated temperature and a superatmospheric pressure of hydrogen in the presence of a hydrogenation catalyst. With the oxide type of catalysts, such as those which have been developed in recent years for the hydrogenation of esters to alcohols or for the hydrogenation of amides to amines, the hydrogenolysis of the phenolic tertiary amine compound to the corresponding methylated phenolic compound is obtained with little or no hydrogenation of the aromatic nucleus. The "copper chromite" catalysts in general are suitable. Suitable catalysts of this type are for example the copper oxide-chromium oxide-alkaline earth oxide catalysts described by Adkins and Connor, J. Amer. Chem. Soc., 53, 1091 (1931). Other stabilized copper oxide hydrogenation catalysts such as the copper oxide-aluminum oxide catalysts described in U. S. Patent No. 2,118,001 are also effective. Numerous special modifications of these catalysts may be used without changing materially the nature of the results obtained. For example, the catalyst may contain added "promoters" or mixtures of other metal oxides such as have been disclosed for the methanol synthesis. In general, the copper oxide-containing catalysts are preferred when only hydrogenolysis is involved. Other oxide catalysts such as cobalt oxide-containing catalysts described in U. S. Patent No. 2,118,007 may be used although there is then usually obtained an appreciable amount of hydrogenation of the nucleus as well as hydrogenolysis. Other catalysts which may be used are, for example, those disclosed in U. S. Patents Nos. 2,137,407, 2,089,433, 2,105,664, and 2,116,552.

If the methylated hydroaromatic alcohol is desired, the active free metal hydrogenation catalysts, such as finely divided nickel, are suitable. In this case both hydrogenation and hydrogenolysis are involved.

The temperature of hydrogenolysis (and of hydrogenation, if desired) should be above 100° C. and below 300° C., and preferably between 150° and 250° C. The pressure of hydrogen is not critical. A pressure below 200 lbs. per square inch is not very practical because the reaction is then slow. The upper limit of pressure is fixed only by availability and strength of autoclave materials. A pressure of 1000 to 3000 lbs. per square inch is practicable from all standpoints.

An inert solvent may be advantageously employed for high melting materials, for small amounts of material, or for materials which allow the formation of water as a side reaction. Suitable solvents are, for example, dioxane or alcohol. If there is no difficulty due to water, then hydrocarbon solvents, preferably saturated, are suitable.

The following examples illustrate this invention.

Example 1

Phenol (1 mol) is mixed with 1 mol equivalent of aqueous dimethylamine and 1 mol equivalent of formaldehyde is added gradually with cooling and stirring. After standing 24 hours, the oil which separates is removed, washed with water and dried. It is then mixed with 5 to 10 per cent. by weight of copper oxide-chromium oxide catalyst and heated for 3 hours in a shaking autoclave at 175° C. with hydrogen at a pressure of 3000 lbs. per square inch. The product is filtered, acidified with hydrochloric acid and distilled with steam. The oily distillate consists of a mixture of phenol, ortho-cresol, and a small amount of a xylenol.

By using Raney nickel in place of copper oxide-chromium oxide, the product obtained is chiefly methyl cyclohexanol.

Example 2

Phenol (1 mol) is mixed with 2 mol equivalents of aqueous 25% dimethylamine solution, and while cooling and shaking are applied, 2 mol equivalents of aqueous 30% formaldehyde are added. The mixture is allowed to stand for 48 hours at room temperature. The oil layer is separated, mixed with 5% of its weight of copper oxide-chromium oxide catalyst and heated in a shaking autoclave for 4 hours at 175° C. with hydrogen at a pressure of 1500 lbs. per square inch. The resulting oil is filtered to remove the catalyst, acidified with hydrochloric acid and distilled in a current of steam. The oil which distils over is a mixture of cresols and xylenols.

Example 3

Phenol (1 mol) is mixed with 3.1 mol equivalents each of dimethylamine and formaldehyde as described above and the mixture heated at 80–90° C. under reflux for one and one-quarter hours. The hot solution is saturated with solid sodium chloride and allowed to stratify at a temperature of 80–90° C. The oil layer which thus forms is separated while hot. This oil is purified by solution in cold water. When the solution is heated, the oil again separates.

100 parts of this oil is mixed with 10 parts of copper oxide-chromium oxide catalyst and heated at 170–180° C. for 4 hours in an agitated autoclave with hydrogen under a pressure of 1500 lbs. per square inch.

The filtered product is acidified with hydrochloric acid and distilled in a current of steam. The product comes over as a colorless oil which after distillation in vacuo boils at 205–210° C./762 mm. and represents a mixture of 2,4- and 2,6-xylenol.

Example 4

144 g. of β-naphthol was dissolved in 200 cc. of methanol. To the solution 211 cc. of 25% dimethylamine solution was added. To the cooled mixture 107 cc. of 30% formaldehyde was added at 10–20° C. The mixture was stirred four hours and the crystalline product then filtered off and recrystallized from methanol, M. P. 75° C.

100 parts of the above dimethylaminomethyl-naphthol was dissolved in an equal weight of dioxane and heated with 10 parts of copper oxide-chromium oxide catalyst in a shaking autoclave at 175° C. with hydrogen at 1500 lbs. per square inch for four hours.

The product was filtered to remove the catalyst and the dioxane was removed by evaporation. The residual dark oil was then distilled with steam whereupon an oil distilled over which rapidly crystallized in colorless needles consisting of 1-methyl-2-naphthol.

In a similar manner p-phenylphenol gives with formaldehyde and piperidine a crystalline compound, M. P. 86° C., which upon hydrogenolysis as in Example 4 yields p-phenyl-o-cresol.

Hydroquinone with formaldehyde and dimethylamine gives a crystalline compound, M. P. 190° C., which upon hydrogenolysis as in Example 4 gives 2,5-dimethyl-hydroquinone.

Pyrogallol with formaldehyde and morpholine gives a crystalline compound, M. P. 174–175° C., which upon hydrogenolysis as in Example 4 gives dimethyl pyrogallol.

1,3,5-xylenol with formaldehyde and dimethylamine gives a crystalline compound, M. P. 42° C., which upon hydrogenolysis as in Example 4 gives 2,3,5-trimethylphenol.

By the process herein described one or more methyl groups may be introduced into a phenolic nucleus or one or more methyl groups may be introduced and during the process the aromatic compound reduced with hydrogen. Such methylated products are useful as solvents, as disinfectants, as chemical intermediates for dyes, explosives, pharmaceutical products, etc.

We claim:

1. A process for preparing nuclearly methylated derivatives of hydroxyaromatic compounds, which comprises condensing a methylol-forming phenol with at least one molecular equivalent each of formaldehyde and a strongly basic, secondary, non-aromatic amine and reacting the condensation product with hydrogen under a pressure of at least 200 lbs. per square inch in the presence of a hydrogenation catalyst at a temperature between 100° C. and about 300° C.

2. A process for preparing nuclearly methylated phenols, which comprises condensing a methylol-forming phenol with at least one molecular equivalent each of formaldehyde and a strongly basic, secondary, non-aromatic amine and reacting the condensation product with hydrogen under a pressure of at least 200 lbs. per square inch in the presence of a free metal hydrogenation catalyst at a temperature between 100° C. and about 300° C.

3. A process for preparing nuclearly methylated phenols, which comprises condensing a methylol-forming phenol with at least one molecular equivalent each of formaldehyde and a strongly basic, secondary, non-aromatic amine and reacting the condensation product with hydrogen under a pressure of at least 200 lbs. per square inch in the presence of a copper-chromite catalyst at a temperature between 150° and 250° C.

4. A process for preparing a nuclearly methylated hydroxy aromatic compound, which comprises reacting a condensate of a phenol, formaldehyde, and a strongly basic, secondary, non-aromatic amine with hydrogen under a pressure of at least 200 lbs. per square inch in the presence of a hydrogenation catalyst at a temperature between 100° C. and about 300° C.

5. A process for preparing a nuclearly methylated phenol, which comprises reacting a condensate of a phenol, formaldehyde, and a strongly basic, secondary, non-aromatic amine with hydrogen under a pressure of at least 200 lbs. per square inch in the presence of a metal oxide-containing hydrogenation catalyst at a temperature between 100° C. and about 300° C.

6. A process for preparing nuclearly methylated derivatives of methylol-forming hydroxy aromatic compounds, which comprises condensing said hydroxy aromatic compound with at least one molecular equivalent each of formaldehyde and dimethylamine, and reacting the condensation product with hydrogen under a pressure of at least 200 lbs. per square inch in the presence of a hydrogenation catalyst at a temperature between 100° C. and about 300° C.

7. A process for preparing nuclearly methylated derivatives of methylol-forming hydroxy aromatic compounds, which comprises condensing said hydroxy aromatic compound with at least one molecular equivalent each of formaldehyde and dimethylamine, and reacting the condensation product with hydrogen under a pressure of at least 200 lbs. per square inch in the presence of an active copper-chromite hydrogenation catalyst at a temperature between about 150° C. and 250° C.

HERMAN A. BRUSON.
LLOYD W. COVERT.